(12) United States Patent
Singh et al.

(10) Patent No.: US 10,180,319 B2
(45) Date of Patent: Jan. 15, 2019

(54) DEVICE AND METHOD TO DETERMINE HEIGHT OF A PANEL USING ELEVATION DETERMINATION

(71) Applicant: Nortek Security & Control LLC, Carlsbad, CA (US)

(72) Inventors: Inderjit Singh, San Diego, CA (US); James Joseph Haflinger, Carlsbad, CA (US); John Rodney Johnson, San Marcos, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 110 days.

(21) Appl. No.: 15/389,033

(22) Filed: Dec. 22, 2016

(65) Prior Publication Data

US 2018/0180413 A1    Jun. 28, 2018

(51) Int. Cl.
| | |
|---|---|
| *G01C 5/06* | (2006.01) |
| *G01C 9/00* | (2006.01) |
| *G01H 1/00* | (2006.01) |
| *G01P 15/00* | (2006.01) |
| *E06B 7/28* | (2006.01) |
| *E06B 3/48* | (2006.01) |

(52) U.S. Cl.
CPC ............... *G01C 5/06* (2013.01); *E06B 3/485* (2013.01); *E06B 7/28* (2013.01); *G01C 9/00* (2013.01); *G01H 1/00* (2013.01); *G01P 15/00* (2013.01)

(58) Field of Classification Search
CPC .... G01C 5/06; G01C 9/00; E06B 3/44; E06B 7/28; G01H 1/00; G01P 15/00
USPC ........................................................... 73/579
See application file for complete search history.

(56) References Cited

U.S. PATENT DOCUMENTS

| | | | | |
|---|---|---|---|---|
| 4,975,679 | A   * | 12/1990 | Ballyns | ............... B60C 23/0408 |
| | | | | 116/34 R |
| 2007/0218823 | A1 * | 9/2007 | Wolf | ........................ G01C 5/06 |
| | | | | 454/72 |
| 2012/0072110 | A1 * | 3/2012 | Venkatraman | ........... G01C 5/06 |
| | | | | 701/434 |
| 2014/0172351 | A1 * | 6/2014 | Barfield | .................... G01C 5/06 |
| | | | | 702/138 |
| 2017/0198516 | A1 * | 7/2017 | Dey | ........................ E05F 15/77 |

* cited by examiner

*Primary Examiner* — Natalie Huls
*Assistant Examiner* — Monica S Young
(74) *Attorney, Agent, or Firm* — Schwegman Lundberg & Woessner, P.A.

(57) ABSTRACT

A device for measuring a position of a panel of an overhead garage door is described. The device has an accelerometer, an atmospheric pressure sensor, and a processor. The accelerometer is attached to the panel and detects a motion or vibration of the panel. The atmospheric pressure sensor triggers a measurement of an ambient atmospheric pressure in response to the detected motion of the panel. A state of the panel is determined based on a combination of the measured ambient atmospheric pressure and the detected motion of the panel.

20 Claims, 6 Drawing Sheets

DEVICE AND METHOD TO DETERMINE HEIGHT OF A PANEL USING ELEVATION DETERMINATION

TECHNICAL FIELD

This application relates generally to a device for measuring the position or elevation of an object, and, in an example embodiment, a detection device for measuring the position of a panel of an overhead garage door.

BACKGROUND

Commonly, the position of an overhead garage door is determined based on three types of sensors: end limit switches, a tilt switch, and an accelerometer. The end limit switches determine whether the garage door is completely closed, fully open, or somewhere in between. The tilt switch will only trigger at one particular angle based on the angular position of the tilt switch. In many garage door control systems, the tilt switch cannot be used to identify or determine a closed or opened position of the garage door. For example, if the garage door is left partially open, the tilt switch may not be able to signify open until the garage door has opened past the point where someone can sneak in under the gap.

The accelerometer can be used to tell the angle of the garage door and can work well for one-piece garage doors (also known as California garage doors). However, for a segmented door, the accelerometer can be placed on any segment, section, or panel. For example, if the accelerometer is placed on the top panel, the sensor is very good at determining that the garage door is open just a little bit, but often is unable to determine the difference between that little bit and all the way open. The opposite is true for the bottom segment.

Therefore, the use of limit switches, a tilt switch sensor, or an accelerometer may not be useful in determining the position of of an overhead garage door as the door is opening/closing.

BRIEF DESCRIPTION OF THE DRAWINGS

The present embodiments are illustrated by way of example, and not by way of limitation, in the figures of the accompanying drawings.

DETAILED DESCRIPTION

Figure 1A:
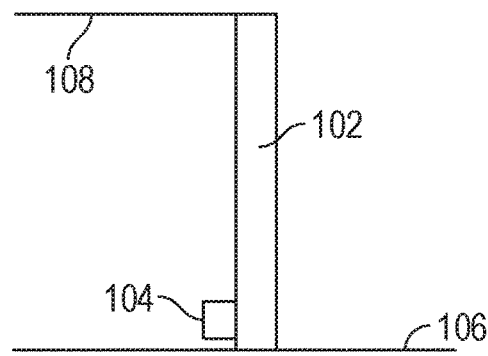
FIG. 1A is a diagram illustrating a side view of a device attached to a one-piece overhead garage door in the closed position.

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The present disclosure recognizes, among other things, that small changes in atmospheric pressure may be used in determining the position of an opening garage door. Atmospheric air pressure sensors can resolve the difference in air pressure of as little as a few inches of altitude. One of the challenges with measuring pressures in such small increments is distinguishing altitude changes from differences in air pressure due to wind, other doors opening and closing, and atmospheric conditions. To do so, a magnetometer (orientation) or an accelerometer (motion/vibration) can be used to determine when to get readings of the changes due to the door opening and closing so that the position-measuring device does not reflect signal changes other than pressure changes caused by altitudinal changes. Furthermore, the data from the accelerometer or magnetometer can be used to calibrate the position-measuring device (by opening and closing the garage door).

The presently described position-measuring device can be applied to and used for any sensing application where the vertical motion or vertical displacement of an object is of interest. As sensors become more sensitive, the position-measuring device can be used for a window that opens vertically so that the window does not require a magnet to be placed in a specific location. In other examples, the position-measuring device can be used to determine when any window or exterior door is opened or closed by monitoring the change in atmospheric pressure in addition to the motion of the sensor itself.

In another example application, the elevation of an object can be determined by attaching the position-measuring device to the object. This could help determine on which floor a piece of equipment (the object) is located. The use of the present position-measuring device can complement or replace current intrusion sensors in an overhead garage door system. For example, the accelerometer/magnetometer can be used to detect motion and the altimeter (atmospheric pressure sensor) can be used to determine vertical displacement to figure out the fully open and closed positions of the overhead garage door. The position-measuring device can also be added to infrared beams for detecting whether an object is obstructing the closure of the overhead garage door.

In various embodiments, a device for measuring a position/elevation of an overhead garage door opening is described. The device has an accelerometer, an atmospheric pressure sensor, and a processor. The accelerometer is attached to the panel and detects a motion or vibration of the panel. The atmospheric pressure sensor triggers a measurement of an ambient atmospheric pressure in response to the detected motion of the panel. A state of the panel is determined based on a combination of the measured ambient atmospheric pressure and the detected motion of the panel.

The state of the panel identifies an open position or a closed position of the overhead garage door. In one example embodiment, the device determines a position of the panel based on the combination of the measured ambient atmospheric pressure and the detected motion of the panel.

In another example embodiment, the device detects a first vibration of the panel using the accelerometer, determines that the first vibration exceeds a vibration threshold, measures a first ambient atmospheric pressure in response to the first vibration exceeding the vibration threshold, detects a second vibration of the panel using the accelerometer, determines that the second vibration is less than the vibration threshold after determining that the first vibration exceeds the vibration threshold, measures a second ambient atmospheric pressure in response to the second vibration being lower than the vibration threshold, computes a pressure differential between the first ambient atmospheric pressure and the second ambient atmospheric pressure, correlates the pressure differential to a vertical displacement of the panel, and computes the size of the opening of the panel based on the vertical displacement of the panel.

In another example embodiment, the device detects a first calibration user input on the device, the first calibration user input identifying a first state of the panel; measures a first ambient atmospheric pressure in response to the first calibration user input; detects a second calibration user input on the device, the second calibration user input identifying a second state of the panel; measures a second ambient atmospheric pressure in response to the second calibration user input; computes a pressure differential between the first ambient atmospheric pressure and the second ambient atmospheric pressure; and correlates the pressure differential to a predefined vertical displacement of the panel, the predefined vertical displacement based on the first state and the second state.

In another example embodiment, the device computes a second vertical displacement of the panel based on a second pressure differential.

In another example embodiment, the panel is part of a window or a vertically displaceable object.

In another example embodiment, the device includes a magnetometer configured to detect an orientation of the panel. The position of the panel is determined based on a combination of the measured ambient atmospheric pressure, the detected motion of the panel, and the orientation of the panel. The position includes a height of the opening of the garage door (from the floor).

In another example embodiment, the device includes a communication module configured to communicate the position of the panel to a garage door system, home/facility security or automation system, or other electronic system.

FIG. 1A is a diagram illustrating a side view of a device attached to a bottom portion of an overhead garage door in a closed position. A device 104 (e.g., elevation-measuring device) is attached to a bottom portion of an overhead garage door 102. In a vertical (closed) position, the overhead garage door 102 spans from a ceiling 108 to a floor 106. The device 104 may be attached to the interior of the overhead garage door 102 to prevent the device 104 from being exposed to outside elements (e.g., rain, snow, wind, sun).

Figure 1B:
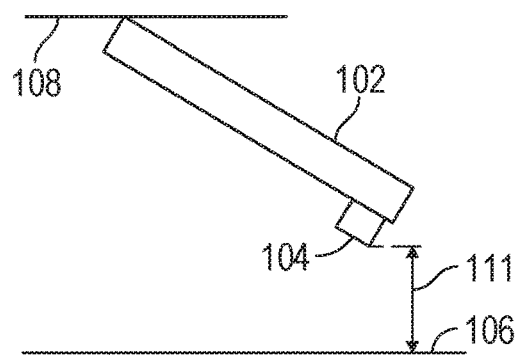
FIG. 1B is a diagram illustrating a side view of a device attached to a one-piece overhead garage door in a partially open position.

FIG. 1B is a diagram illustrating a side view of the device 104 attached to a bottom portion of a one-piece overhead garage door in a partially open position. The device 104 is capable of determining a height 111 of an opening of the overhead garage door 102. The device 104 can therefore provide information such as whether the overhead garage door 102 is fully closed, fully opened, or partially opened (and the height of the opening of the partially opened position).

Figure 1C:
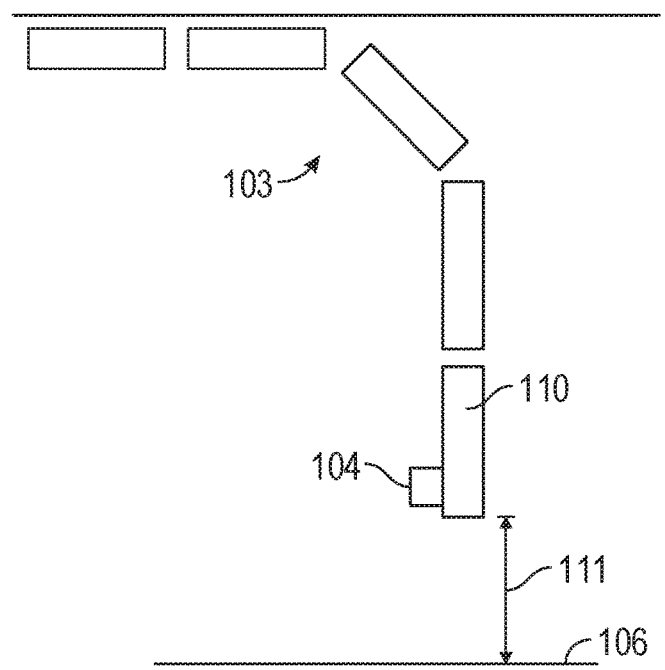
FIG. 1C is a diagram illustrating a side view of a device attached to a panel of a segmented overhead garage door in a partially open position.

FIG. 1C is a diagram illustrating a side view of the device 104 attached to a panel 110 of a segmented overhead garage door 103 in a partially opened position. The device 104 is also capable of determining the height 111 of an opening of the segmented overhead garage door 103. The device 104 can therefore provide information such as whether the segmented overhead garage door 103 is fully closed, fully opened, or partially opened (and the height of the opening of the partially opened position).

Figure 2:
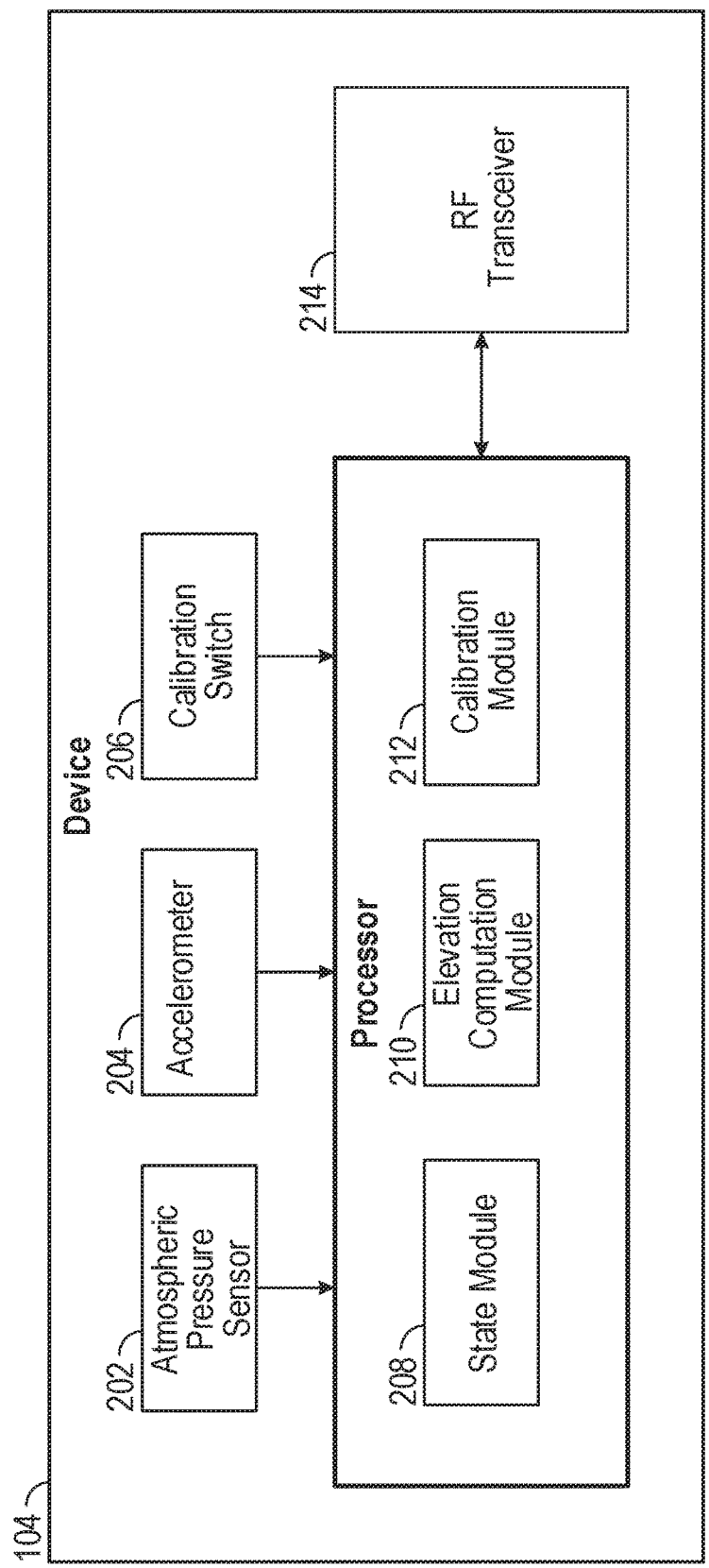
FIG. 2 is a block diagram illustrating an example embodiment of the device of FIGS. 1A-IC.

FIG. 2 is a block diagram illustrating an example embodiment of the device 104. The device 104 includes an atmospheric pressure sensor 202 (e.g., altimeter), an accelerometer 204, a calibration switch 206, a processor 207, and a communication component (e.g., radio frequency (RF) transceiver 214). The atmospheric pressure sensor 202 measures a pressure ambient to the atmospheric pressure sensor 202. The accelerometer 204 is capable of measuring acceleration, motion, and vibrations. The device 104 can also include a magnetometer (not shown) that can be used to measure an orientation of the device 104. The calibration switch 206 (e.g., a button) may be used as a user input to calibrate the device 104 by identifying a closed position and an open position of the overhead garage door 102. For example, a user may press a button when the overhead garage door 102 is in a closed position to indicate a closed position to the device 104. The user may press the button again when the overhead garage door 102 is in an open position to indicate an open position to the device 104.

The processor 207 receives sensor data from the atmospheric pressure sensor 202, the accelerometer 204, and the calibration switch 206 to determine the state/position (e.g., opened, closed, partially opened) of the overhead garage door 102 and the position of an opening of the overhead garage door 102 if the overhead garage door 102 is opened or partially opened. In one example embodiment, the processor 207 includes a state module 208, an elevation computation module 210, and a calibration module 212.

The state module 208 determines the position of the overhead garage door 102 based on the sensor data from the atmospheric pressure sensor 202 and from the accelerometer 204. For example, the accelerometer 204 senses vibration (resulting from a movement of the garage door opening or closing). This triggers the atmospheric pressure sensor 202 to generate a first measure of ambient pressure. When the garage door stops moving, this triggers the atmospheric pressure sensor 202 to generate a second measure of ambient pressure. The state module 208 then computes the differential air pressure between the first measure of ambient pressure and the second measure of ambient pressure to determine whether the garage door is in an open, closed, or in a partially open state. Therefore, readings of the pressure are performed at the beginning and ending of movement. For example, if the differential air pressure exceeds a predetermined pressure threshold, the state module 208 determines that the garage door is closed. If the differential air pressure is within a predetermined pressure threshold or range, the state module 208 determines that the garage door is partially open. If the differential air pressure is small (e.g., within a smaller predetermined pressure threshold or range), the state module 208 determines that the garage door is still closed.

In another example, a wind triggers the overhead garage door 102 to vibrate. This triggers a reading of the ambient pressure. When the overhead garage door 102 stops vibrating, another reading of the ambient pressure is performed. The state module 208 determines that the overhead garage door 102 is still closed because the difference in ambient air pressure between the two readings is minimal or within a smaller range (e.g., a tenth of the ambient pressure differential range between the open and closed garage door positions).

In another example, the atmospheric pressure ambient to the overhead garage door 102 has changed without the accelerometer 204 detecting any vibration or motion due to a rapidly approaching thunderstorm. Because there was no vibration or motion in the garage door, no reading of the ambient pressure is performed. Therefore, the state module 208 determines that the overhead garage door 102 remained closed or open.

The elevation computation module 210 computes the elevation of the opening of the garage door based on the relative elevation of the device 104 to the floor 106. The elevation computation module 210 correlates the pressure differential to an elevation measurement. For example, the pressure differential between an open and a closed position of the overhead garage door 102 is determined to be delta Pa (e.g., r=d1 Pa (measured when the overhead garage door 102 is closed)–d2 Pa (measured when the overhead garage door 102 is open). Given the standard or predetermined height, h, of a garage door (e.g., 7 feet), the height of the opening of the garage door is inversely proportional to the rate at which the ambient pressure decreases (e.g., a drop in x Pa results in an opening of y inches) using the rate of delta Pa/h.

The calibration module 212 provides a method to determine the delta Pa. For example, the atmospheric pressure sensor 202 measures a first ambient pressure (e.g., d1 Pa) in response to the user triggering the calibration switch 206 to indicate that the garage door is in a closed position. The atmospheric pressure sensor 202 measures a second ambient pressure (e.g., d2 Pa) in response to the user triggering the calibration switch 206 to indicate that the garage door is in a fully open position.

The communication component includes a wired or wireless transceiver configured to communicate with another device such as a control panel of a security system, a control panel of the garage door system, or a remote server (via the Internet). In one example embodiment, the communication component transmits the position or state (e.g., open, closed, partially open) and the height of the opening of the overhead garage door 102.

Figure 3A:
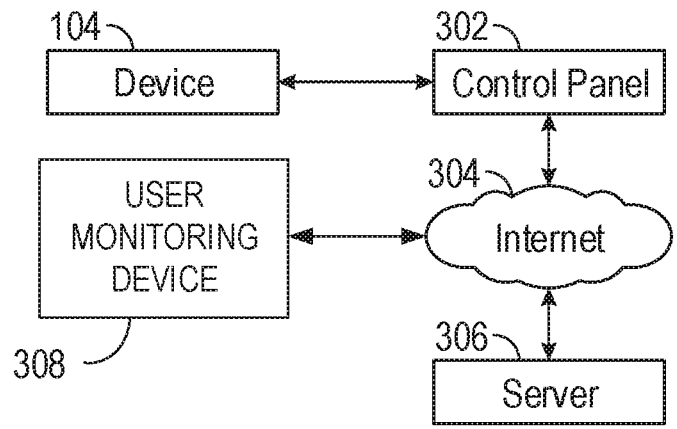
FIG. 3A is a block diagram illustrating an example embodiment of a networked system for implementing the device.

FIG. 3A is a block diagram illustrating an example embodiment of a networked system for implementing the device 104. The device 104 communicates with a control panel 302 of a garage system via wireless means (e.g., RF, Wi-Fi, Bluetooth). The control panel 302 communicates with a remote server 306 via a communication network 304 (e.g., the Internet). The remote server 306 receives the status of the overhead garage door 102 and can perform different functions based on the status of the overhead garage door 102. For example, the remote server 306 can alert or notify the homeowner's device 308 (e.g., a smart phone) that the overhead garage door 102 has been left open for more than x hours. The remote server 306 can also receive instructions from the homeowner's device 308 to open the garage door halfway. The remote server 306 communicates the desired height of the opening to the control panel 302 to direct the overhead garage door 102 to open and to close at the desired height based on the computed height of the opening of the overhead garage door 102. In that example, the atmospheric pressure sensor 202 starts continuously monitoring the ambient pressure after the overhead garage door 102 starts moving. The elevation computation module 210 dynamically calculates the height of the opening based on the ambient pressure and notifies the control panel 302 when the desired ambient pressure (and desired opening) is reached.

Figure 3B:
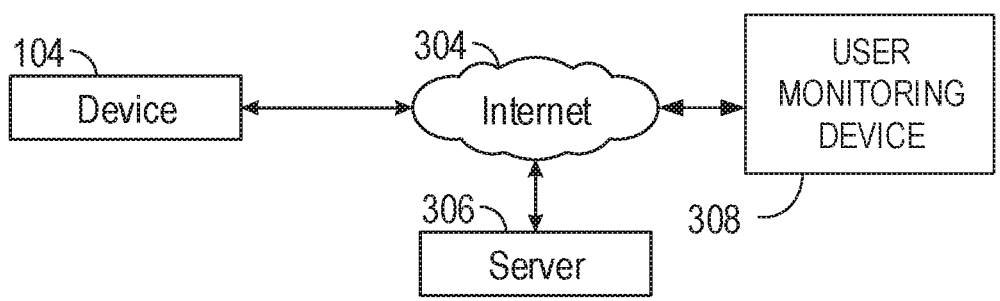
FIG. 3B is a block diagram illustrating another example embodiment of a networked system for implementing the device.

FIG. 3B is a block diagram illustrating another example embodiment of a networked system for implementing the device 104. The device 104 communicates with the remote server 306 and the homeowner's device 308 via the communication network 304 (e.g., the Internet).

Figure 4:
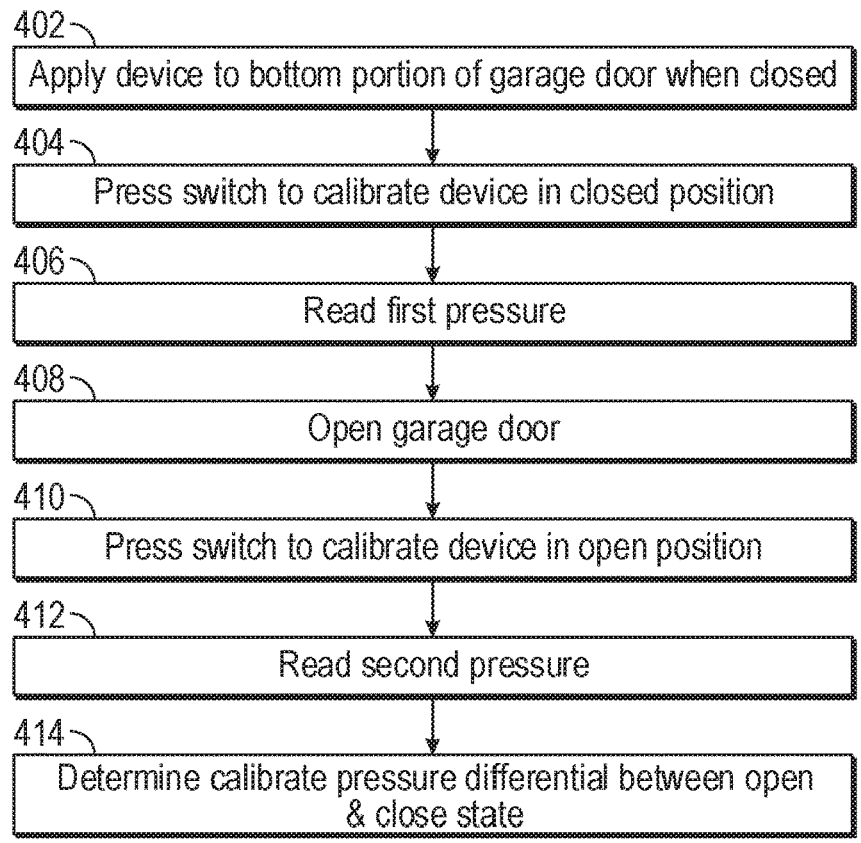
FIG. 4 is a flow diagram illustrating an example embodiment of a calibration method of the device.

FIG. 4 is a flow diagram illustrating an example embodiment of a calibration method of the device 104. At operation 402, a user applies the device 104 to a bottom portion or panel of an overhead garage door when the garage door is closed. At operation 404, the user presses on the calibration switch 206 to indicate that the garage door is in the closed position. At operation 406, the atmospheric pressure sensor 202 reads the ambient pressure in response to operation 404. At operation 408, the user opens the garage door. At operation 410, the user presses on the calibration switch 206 to indicate that the garage door is in an open position. At operation 412, the atmospheric pressure sensor 202 reads the ambient pressure in response to operation 410. At operation 414, the calibration module 212 determines a calibration pressure differential between the ambient pressure when the garage door is in an open state and the ambient pressure when the garage door is in a closed state. The calibration module 212 then determines the rates at which the ambient pressure drops between the closed and open states.

Figure 5:
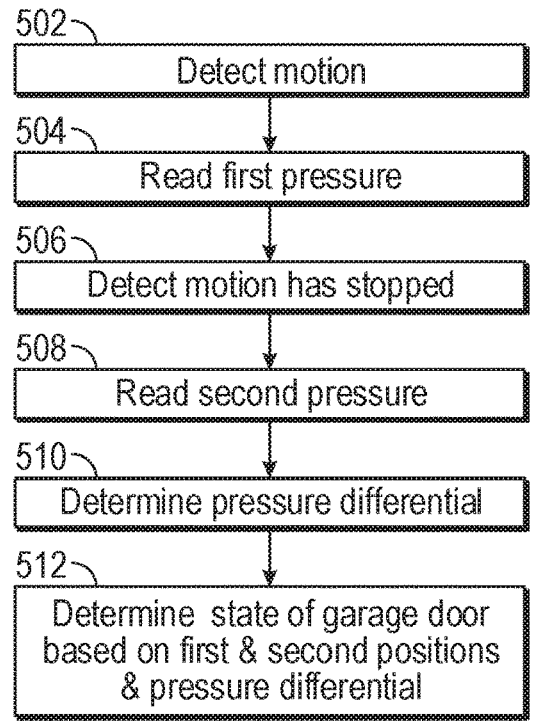
FIG. 5 is a flow diagram illustrating an example embodiment of a method of an operation of the device.

FIG. 5 is a flow diagram illustrating an example embodiment of a method of an operation of the device 104. At operation 502, the accelerometer 204 detects vibration. At operation 504, the atmospheric pressure sensor 202 generates a first reading of the ambient pressure in response to the detected vibration. At operation 506, the accelerometer 204 detects that the vibration has stopped. At operation 508, the atmospheric pressure sensor 202 generates a second reading of the ambient pressure in response to the accelerometer 204 detecting that the vibration has stopped. At operation 510, the state module 208 computes the pressure differential between the first ambient pressure reading and the second ambient pressure reading. At operation 512, the state module 208 determines the state (e.g., open, closed, partially open) of the garage door based on the pressure differential determined in operation 510.

Figure 6:
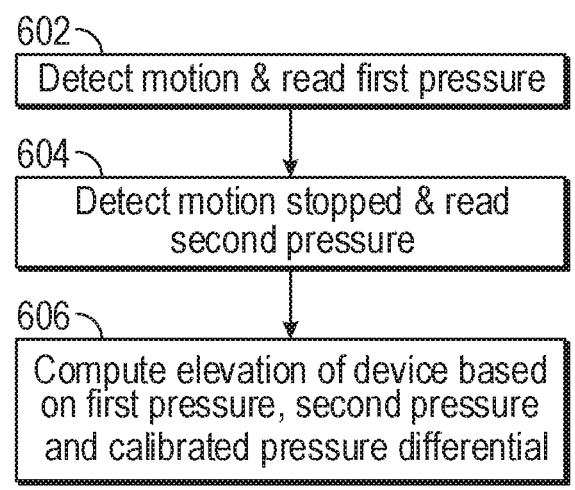
FIG. 6 is a flow diagram illustrating an example embodiment of a method for computing a position of a panel of an overhead garage door.

FIG. 6 is a flow diagram illustrating an example embodiment of a method for computing the elevation of a panel of an overhead garage door. At operation 602, the accelerometer 204 detects vibration and the atmospheric pressure sensor 202 generates a first reading of the ambient pressure in response to the detected vibration. At operation 604, the accelerometer 204 detects that the vibration has stopped and the atmospheric pressure sensor 202 generates a second reading of the ambient pressure in response to the accelerometer 202 detecting that the vibration has stopped. At operation 606, the elevation computation module 210 computes the pressure differential between the first ambient pressure reading and the second ambient pressure reading and determines the height of the garage door opening based on the computed pressure differential.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the communication network 304 and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 304.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network 304. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture

Figure 7:
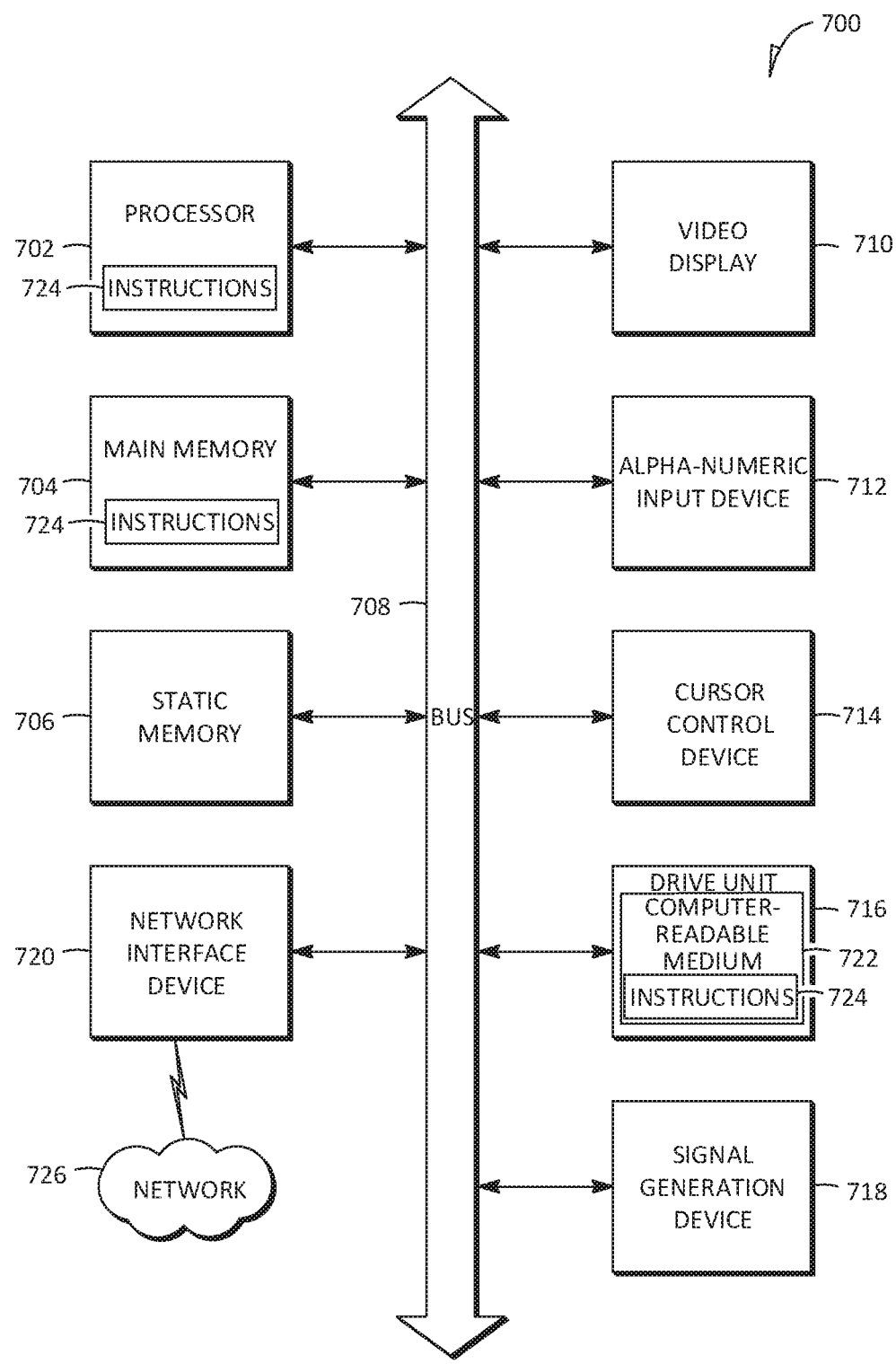
FIG. 7 shows a diagrammatic representation of a machine in the example form of a computer system within which a set of instructions may be executed to cause the machine to perform any one or more of the methodologies discussed herein.

FIG. 7 is a block diagram of a machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing the instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a computer-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting computer-readable media 722. The instructions 724 may also reside, completely or at least partially, within the static memory 706.

While the computer-readable medium 722 is shown, in an example embodiment, to be a single medium, the term "machine-readable medium" may include a single medium or multiple media (e.g., a centralized or distributed database, and/or associated caches and servers) that store the one or more instructions 724 or data structures. The term "computer-readable medium" shall also be taken to include any tangible medium that is capable of storing, encoding, or carrying the instructions 724 for execution by the machine and that cause the machine to perform any one or more of the methodologies of the present embodiments, or that is capable of storing, encoding, or carrying data structures utilized by or associated with such instructions 724. The term "computer-readable medium" shall accordingly be taken to include, but not be limited to, solid-state memories, and optical and magnetic media. Specific examples of computer-readable media 722 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communication network 726 using a transmission medium. The instructions 724 may be transmitted using the network interface device 720 and any one of a number of well-known transfer protocols (e.g., hypertext transfer protocol (HTTP)). Examples of communication networks 726 include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying the instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The following enumerated embodiments describe various example embodiments of a position-measuring device discussed herein.

A first embodiment provides a device 104 comprising:
an accelerometer 204 configured to be attached to a panel 110 and to detect a motion of the panel;
an atmospheric pressure sensor 202 coupled to the accelerometer 204, the atmospheric pressure sensor configured to trigger a measurement of an ambient atmospheric pressure in response to the detected motion of the panel; and
a processor 207 configured to perform operations comprising:
determining a state of the panel based on a combination of the measured ambient atmospheric pressure and the detected motion of the panel.

A second embodiment provides a device according to the first embodiment, wherein the state of the panel identifies an open position or a closed position.

A third embodiment provides a device according to the first embodiment, wherein the operations further comprise:
determining an elevation of the panel based on the combination of the measured ambient atmospheric pressure and the detected motion of the panel.

A fourth embodiment provides a device according to the third embodiment, wherein the operations further comprise:
detecting a first vibration of the panel using the accelerometer;
determining that the first vibration exceeds a vibration threshold;
measuring a first ambient atmospheric pressure in response to the first vibration exceeding the vibration threshold;
detecting a second vibration of the panel using the accelerometer;
determining that the second vibration is lower than the vibration threshold after determining that the first vibration exceeds the vibration threshold;
measuring a second ambient atmospheric pressure in response to the second vibration being lower than the vibration threshold;
computing a pressure differential between the first ambient atmospheric pressure reading and the second ambient atmospheric pressure reading;
correlating the pressure differential to a vertical displacement of the panel; and
computing the height of an opening of the panel based on the vertical displacement of the panel.

A fifth embodiment provides a device according to the third embodiment, wherein the operations further comprise:
detecting a first calibration user input on the device, the first calibration user input identifying a first state of the panel;
measuring a first ambient atmospheric pressure in response to the first calibration user input;
detecting a second calibration user input on the device, the second calibration user input identifying a second state of the panel;
measuring a second ambient atmospheric pressure in response to the second calibration user input;
computing a pressure differential between the first ambient atmospheric pressure and the second ambient atmospheric pressure; and
correlating the pressure differential to a predefined vertical displacement of the panel, the predefined vertical displacement based on the first state and the second state.

A sixth embodiment provides a device according to the fifth embodiment, wherein the operations further comprise: computing a second vertical displacement of the panel based on a second pressure differential.

A seventh embodiment provides a device according to the first embodiment, wherein the panel is part of an overhead garage door.

An eighth embodiment provides a device according to the first embodiment, wherein the panel is part of a window or a vertically displaceable object.

A ninth embodiment provides a device according to the first embodiment, further comprising:
a magnetometer configured to detect an orientation of the panel,
wherein the operations further comprise:
determining a position of the panel based on a combination of the measured ambient atmospheric pressure, the detected motion of the panel, and the orientation of the panel, the position comprising a height of an opening of the panel.

A tenth embodiment provides a device according to the first embodiment, further comprising:
a communication module configured to communicate the state of the panel to a garage door system.

What is claimed is:

1. A device comprising:
an accelerometer configured to be attached to a bottom portion of a panel of an overhead garage door and to detect a motion of the panel;
an atmospheric pressure sensor configured to be attached to the bottom portion of the panel and coupled to the accelerometer, the atmospheric pressure sensor configured to measure an ambient atmospheric pressure at the bottom portion of the panel in response to the detected motion of the panel; and
a processor configured to perform operations comprising:
determining a state of the panel based on a combination of the measured ambient atmospheric pressure and the detected motion of the panel.

2. The device of claim 1, wherein the state of the panel identifies an open position or a closed position.

3. The device of claim 1, wherein the operations further comprise:
determining an elevation of the panel based on the combination of the measured ambient atmospheric pressure and the detected motion of the panel.

4. The device of claim 3, wherein the operations further comprise:
detecting a first vibration of the panel using the accelerometer;
determining that the first vibration exceeds a vibration threshold;
measuring a first ambient atmospheric pressure in response to the first vibration exceeding the vibration threshold;
detecting a second vibration of the panel using the accelerometer;
determining that the second vibration is lower than the vibration threshold after determining that the first vibration exceeds the vibration threshold;
measuring a second ambient atmospheric pressure in response to the second vibration being within the vibration threshold;
computing a pressure differential between the first ambient atmospheric pressure and the second ambient atmospheric pressure;
correlating the pressure differential to a vertical displacement of the panel; and computing a position of the panel based on the vertical displacement of the panel.

5. The device of claim 3, wherein the operations further comprise:
receiving, from a user of the device, a first calibration user input on the device, the first calibration user input identifying a first state of the panel;
measuring a first ambient atmospheric pressure in response to receiving the first calibration user input;
receiving, from a user of the device, a second calibration user input on the device, the second calibration user input identifying a second state of the panel;
measuring a second ambient atmospheric pressure in response to the second calibration user input;
computing a pressure differential between the first ambient atmospheric pressure and the second ambient atmospheric pressure; and
correlating the pressure differential to a predefined vertical displacement of the panel, the predefined vertical displacement based on the first state and the second state.

6. The device of claim 5, wherein the operations further comprise:
computing a second vertical displacement of the panel based on a second pressure differential.

7. The device of claim 1, wherein the panel is part of an overhead garage door.

8. The device of claim 1, wherein the panel is part of a window or a vertically displaceable object.

9. The device of claim 1, further comprising:
a magnetometer configured to detect an orientation of the panel,
wherein the operations further comprise:
determining a position of the panel based on a combination of the measured ambient atmospheric pressure, the detected motion of the panel, and the orientation of the panel, the position comprising a position of the panel.

10. The device of claim 1, further comprising:
a communication module configured to communicate the state of the panel to a garage door system.

11. A method comprising:
detecting a motion of a panel of an overhead garage door using an accelerometer attached to a bottom portion of the panel;
measuring an ambient atmospheric pressure at a bottom portion of the panel in response to the detected motion of the panel using an atmospheric pressure sensor coupled to the accelerometer and attached to the bottom portion of the panel; and
determining a state of the panel based on a combination of the measured ambient atmospheric pressure and the detected motion of the panel.

12. The method of claim 11, wherein the state of the panel identifies an open position or a closed position.

13. The method of claim 11, further comprising:
determining a position of the panel based on the combination of the measured ambient atmospheric pressure and the detected motion of the panel.

14. The method of claim 13, further comprising:
detecting a first vibration of the panel using the accelerometer;
determining that the first vibration exceeds a vibration threshold;
measuring a first ambient atmospheric pressure in response to the first vibration exceeding the vibration threshold;
detecting a second vibration of the panel using the accelerometer;
determining that the second vibration is lower than the vibration threshold after determining that the first vibration exceeds the vibration threshold;
measuring a second ambient atmospheric pressure in response to the second vibration being within the vibration threshold;
computing a pressure differential between the first ambient atmospheric pressure and the second ambient atmospheric pressure;
correlating the pressure differential to a vertical displacement of the panel; and
computing the position of the panel based on the vertical displacement of the panel.

15. The method of claim 13, further comprising:
receiving, from a user of the device, a first calibration user input on the device, the first calibration user input identifying a first state of the panel;
measuring a first ambient atmospheric pressure in response to receiving the first calibration user input;
receiving, from a user of the device, a second calibration user input on the device, the second calibration user input identifying a second state of the panel;
measuring a second ambient atmospheric pressure in response to the second calibration user input;
computing a pressure differential between the first ambient atmospheric pressure and the second ambient atmospheric pressure; and
correlating the pressure differential to a predefined vertical displacement of the panel, the predefined vertical displacement based on the first state and the second state.

16. The method of claim 15, further comprising:
computing a second vertical displacement of the panel based on a second pressure differential.

17. The method of claim 11, wherein the panel is part of an overhead garage door, a window, or a vertically displaceable object.

18. The method of claim 11, further comprising:
detecting an orientation of the panel with a magnetometer; and
determining a position of the panel based on a combination of the measured ambient atmospheric pressure, the detected motion of the panel, and the orientation of the panel, the position comprising a position of the panel.

19. The method of claim 11, further comprising:
communicating the state of the panel to a garage door system.

20. A non-transitory computer-readable storage medium storing a set of instructions that, when executed by a processor, cause the processor to perform operations comprising:
detecting a motion of a panel of an overhead garage door using an accelerometer attached to a bottom portion of the panel;
measuring an ambient atmospheric pressure at a bottom portion of the panel in response to the detected motion of the panel using an atmospheric pressure sensor coupled to the accelerometer and attached to the bottom portion of the panel; and
determining a state of the panel based on a combination of the measured ambient atmospheric pressure and the detected motion of the panel.

* * * * *